(12) United States Patent
Butler et al.

(10) Patent No.: US 6,474,816 B2
(45) Date of Patent: Nov. 5, 2002

(54) INTEGRATED RETINAL DISPLAY

(75) Inventors: William C. Butler, Portland, OR (US); Rakesh Kapur, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 74 days.

(21) Appl. No.: 09/751,419

(22) Filed: Dec. 29, 2000

(65) Prior Publication Data
US 2002/0085175 A1 Jul. 4, 2002

(51) Int. Cl.$^7$ ................................................ A61B 3/10
(52) U.S. Cl. ..................................................... 351/221
(58) Field of Search ................................ 351/205, 211, 351/216, 221; 250/235; 382/115, 117, 128

(56) References Cited

U.S. PATENT DOCUMENTS 5,028,802 A * 7/1991 Webb et al. ................. 250/235

* cited by examiner

*Primary Examiner*—George Manuel
(74) *Attorney, Agent, or Firm*—Trop, Pruner & Hu, P.C.

(57) ABSTRACT

A retinal display includes a single integrated circuit that incorporates a light source, conditioning optics, a scanner and the drive electronics. The drive electronics may include a processor-based system and further may include the electronics to enable wireless communication with other processor-based systems. As a result, a head-mounted retinal display or a mobile device (cell phone or PDA or similar) integrated retinal display may provide compact computer functionality.

14 Claims, 4 Drawing Sheets

INTEGRATED RETINAL DISPLAY

BACKGROUND

This invention relays generally to a retinal display.

A retinal display is a display that is scanned directly into the eye of the user. An image for display may be raster scanned by scanning a light source directly into the retina of the user. A color gamut formed of red, green and blue (RGB) (or other available color spaces) may be implemented using appropriate light sources. Each light source may be a laser, laser diode or light emitting diode as examples.

A scanner scans the light source, one (or more) pixel at a time, directly onto the user's retina. A horizontal scanner may use a flexure based mechanical resonance scanner that operates at several kilohertz. A vertical scanner may also be a mechanical scanner operated at non-resonant mode at the frame rate of the display. Other scanners may be utilized as well.

Microvision Inc. of Seattle, Wash. has developed a virtual retinal display 30 that includes a plurality of modules as shown in FIG. 6. The drive electronics module 34 receives and processes signals from an image or graphics source 32. These signals may contain information to control the intensity and color coordinates of a pixel that comprises a part of an image. The drive electronics 34 synchronize the data source with the scanning position information obtained from sensors. The drive electronics 34 in turn communicate with a photonics module 36.

The photonics module 36 may include light sources 38, modulators 42, and color combining optics 40. The display 30 may use very low power light sources 38 to create an image, a single pixel at a time. Gray levels may be created by changing the luminance on a pixel-by-pixel basis. A modulator 42 may take a pixel voltage from a video processor. Laser diodes may be modulated directly by changing the drive current. For laser-based systems, acousto-optic modulators may be used to modulate the beam.

Next, a scanner module 46 that may be mounted on a pair of eye glasses 48, provides mechanical horizontal and vertical scanning to project one pixel at a time onto a diffuser 54. That image may then be transferred through the optics to the retina of a person wearing the glasses 48. By rapidly moving the light source across and down the retina, an image may be painted in a raster pattern. A mechanical resonance scanner may sweep the horizontal axis and a non-resonance scanner may sweep the vertical axis. Eventually, micro-electromechanical scanners (MEMS) that are smaller and lighter than mechanical resonance scanners may be used.

As shown in FIG. 6, the scanner module 46 may include the scanners 52, a focusing lens 50 and a folding mirror 52. In scanning retinal display systems, the display exit pupil may be located at the eye-pupil of the observer. Refractive, reflective and diffractive optical elements can be used to expand and transmit the scanning beam of light through the user's pupil and onto the retina to create the viewable image. Magnification, scan angle, and scanning mirror size determine the field of view and exit pupil size. Since scanning systems may create an exit pupil that is relatively small, a diffractive optical system with a forward scattering diffuser may be used at the intermediate image plane.

The use of a plurality of modules facilitates the design and development of the display. However, it also increases the size and weight of the system and complicates interconnectivity. In some cases the system may not be amenable to head-mounted display or integratable into a handheld portable device such as a Cell Phone or PDA.

Thus, there is a need for better ways to implement retinal displays.

DETAILED DESCRIPTION

Figure 1:
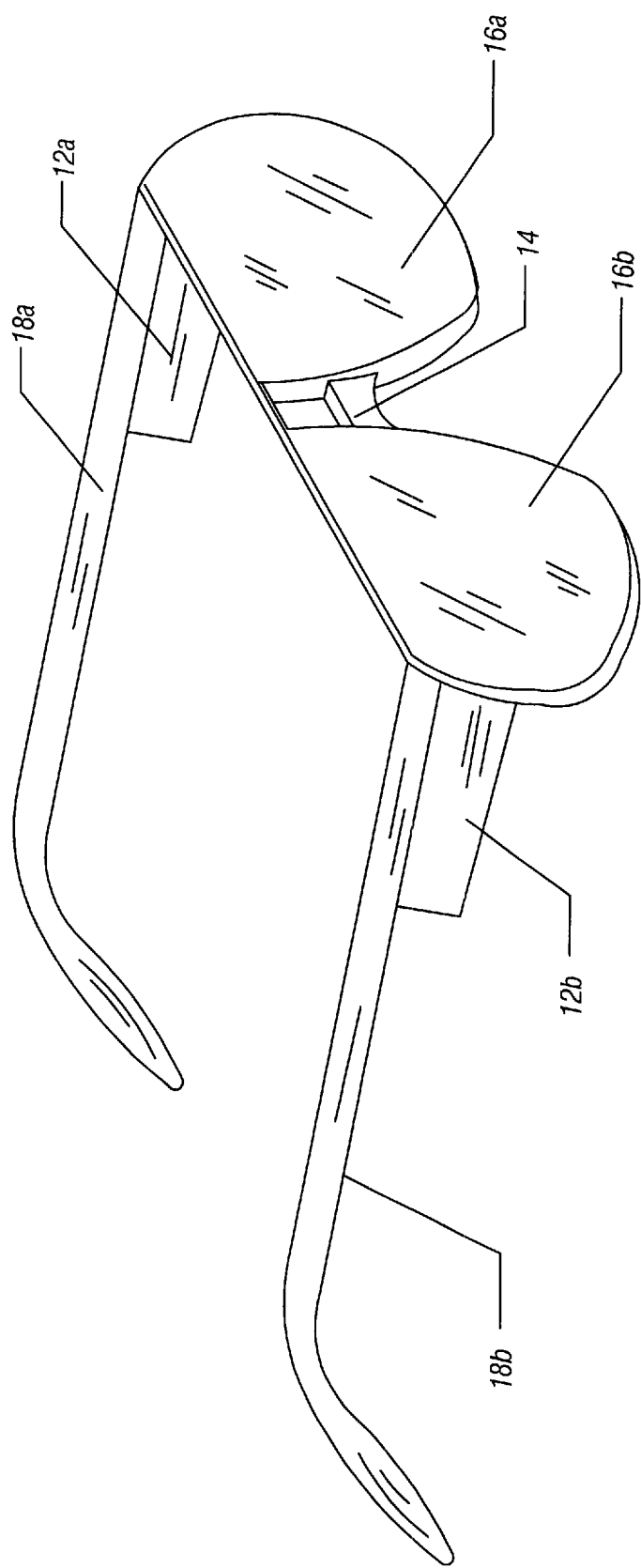
FIG. 1 is a perspective view of one embodiment of the present invention.

Referring to FIG. 1, a retinal display 10 may be incorporated into a head wearable device such as a pair of eye glasses, or integrated into a handheld platform like a Cell Phone or a PDA. Other head wearable devices may include hats, helmets, headphones or headsets as additional examples. In one embodiment, the display 10 may include an eye glass-type frame made up of arms 18a, 18b, and eye glass lenses 16a, 16b. An integrated display circuit 14 may be mounted in the nosepiece between the lenses 16a, 16b. A pair of battery packs 12a, 12b may be positioned on each arm 18a, 18b respectively to distribute the battery weight evenly on the user's nose.

Figure 2:
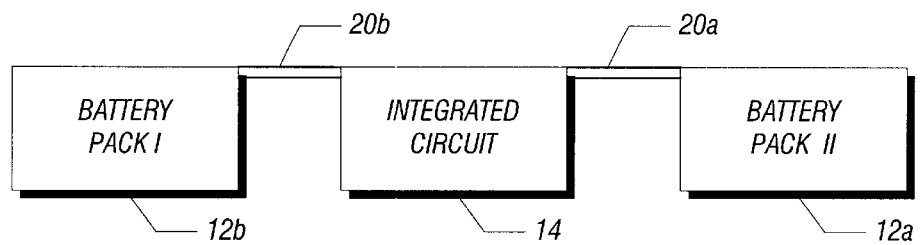
FIG. 2 is a block diagram of the embodiment shown in FIG. 1.

As shown in FIG. 2, the integrated circuit 14 may be supplied with power from each battery pack 12a, 12b through flexible connections 20a, 20b, which weave through the frame of the display 10 in accordance with one embodiment of the present invention. In some cases, the integrated circuit may include all of the electronics other than the battery pack 12 needed to implement the display 10. For example, the integrated circuit 14 may include not only the hardware for implementing the display itself but also a processor or even an entire computer on a chip.

In addition, the integrated circuit 14, in some embodiments, may include radio frequency circuitry for wireless communications with remote processor-based systems. Thus, the circuit 14 may communicate with a remote processor-based system using a wireless protocol such as a cellular telephone link, a short range radio system, or a Bluetooth connection as examples. The remote processor-based system may be worn by the user, carried in the user's pocket, or may be located within the building occupied the user or in a different building.

The integrated circuit 14 may paint an image directly into one or both eyes of the user. Thus an image provided for display or viewing by the user may be projected directly into the user's retina.

Figure 3:
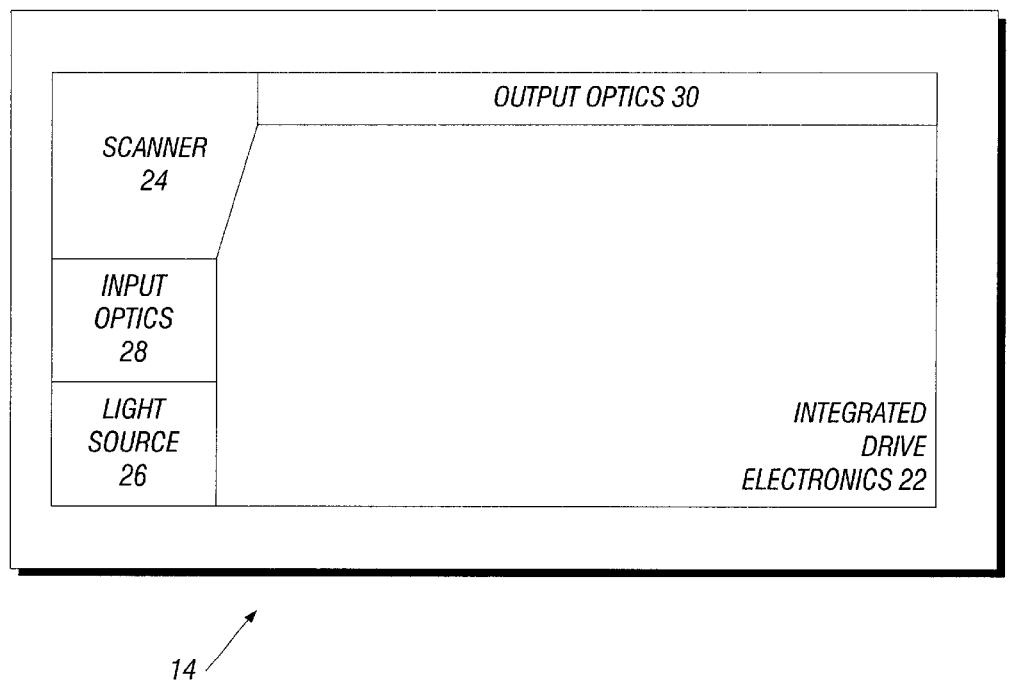
FIG. 3 is a greatly enlarged depiction of the integrated circuit shown in FIG. 2.

Referring to FIG. 3, the integrated circuit 14 may include all the electronic components needed for the display with the exception of the battery packs 12 in one embodiment. The integrated drive electronics 22 may include the electronics to actually drive the display itself as well as a processor or computer technology for providing and generating an actual displayable image. The integrated drive electronics 22 may include components conventionally associated with personal computers including a processor, memory, an interface to peripherals such as a modem, which may connect to the Internet, and an interface card to enable wireless communications, as examples. The integrated drive electronics 22 may include integrated connections to each of the other components included on the integrated circuit 14.

Thus, the integrated drive electronics 22 may have integrated connections to the light source 26, input optics 28, scanner 24, and output optics 30. Each of the components 24–30 may be fixably secured to the integrated circuit 14. This connection may be achieved using adhesives, surface mount techniques, or soldering as examples.

The light source 26 may provide a light beam of red, green and blue light in accordance with one embodiment. Other color spaces may be implemented as well. The light source 26 in one embodiment may be formed of three integrated circuits mounted on the chip 14. Thus, they may be coherent light sources such as laser light sources implemented as light emitting diodes, edge emitting lasers, microlasers, laser diodes, or the like. In addition, non-coherent light sources may also be utilized in some embodiments. The light source 26 may be directly modulated or may include a continuous emitter indirectly modulated by an external modulator such as an acousto-optic modulator (AOM).

The input optics 28 optically adjust the generated light source for scanning by the scanner 24. Thus, the input optics 28 may include physical lenses or may include flat lenses formed by holographic sheets, Fresnel lenses or the like. As a result, the input optics 28 may be formed in a very compact fashion.

The scanner 24 implements raster scanning of the light generated by the light source 26 and conditioned by the input optics 28. The scanner 24 may be of the type described previously in association with the previously described Microvision Inc. virtual retinal display or it may be a MEMS mirror that may be deflected by applying the appropriate potential to a stepper motor under the control of the integrated drive electronics 22. In other words, the integrated drive electronics 22 may provide potential to the scanner 24 through integrated connections therewith in order to drive a MEMS mirror to position the light beam where desired on the user's eye.

A micromechanical phase grating, for example the type developed by Silicon Light Machines (Sunnyvale, Calif.), may also be utilized as the scanner 24. These devices include ribbons that are electronically deflectable to alter the diffraction of light. Electrostatic, electromagnetic and electromechanical techniques may also be used to implement the scanner 24.

The scanned light from the scanner 24 is adjusted for appropriate focal length and appropriate image expansion using movable optical elements in the output optics 30. The optical elements in the output optics 30 may be also relatively compact, lightweight devices that may be implemented by Fresnel lenses, holographic lenses or other relatively space conserving optical devices. Each of these devices may be mounted for movement under control of the drive electronics 22. Thus, the drive electronics 22 may appropriately position each optical element in the input optics 28 and output optics 30 to adjust the optical characteristics of the image that is generated. Electronic shutters may be controlled electronically to turn the display 10 on and off when the drive electronics 22 are otherwise occupied, for example, in completing a processing task.

Thus, in one embodiment, using a scanner 44 implemented with MEMS technology the same linear stepper motor positioning technology utilized in association with MEMS mirror array, may also be utilized to adjust the position of optical components in the input and output optics 28 and 30.

For example, each optical component may be displaced by the application of a suitable charge, which attracts or repels a plate associated with the optical element. Alternatively, electromotive forces, such as magnetic forces, may be electronically generated to appropriately position the optical components.

Figure 4:
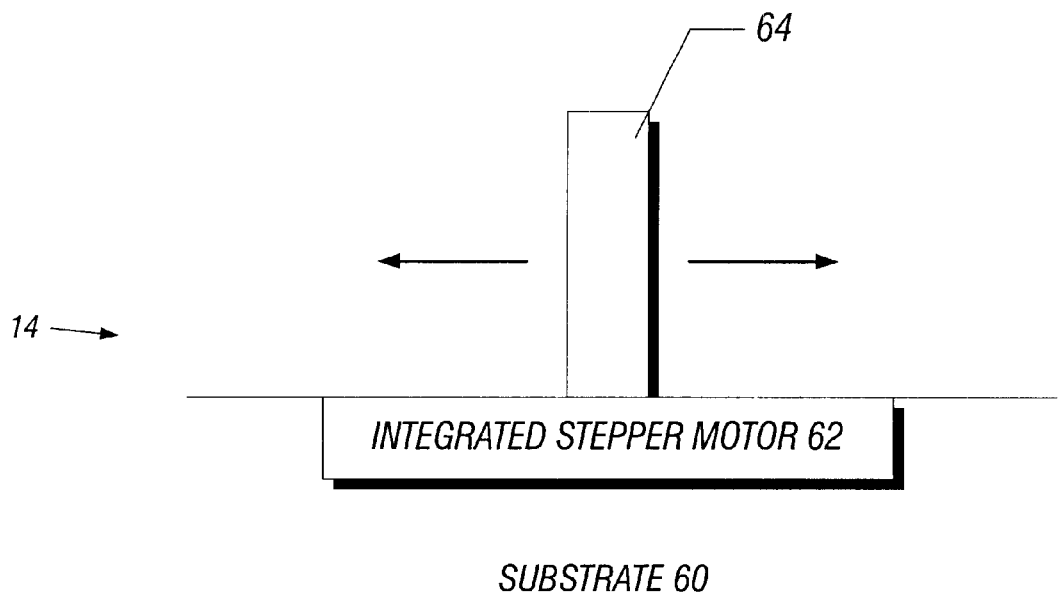
FIG. 4 is a schematic depiction of an adjustable mounting for an optical element.

Referring to FIG. 4, the integrated circuit 14 may include a substrate 60 with one or more integrated stepper motors 62 formed into the substrate 60 using well-known nanotechnology microfabrication techniques. The stepper motors 62 may move an optical element 64 in the directions of the arrows. Thus, the position of the optical element 64 with respect to the light source may be adjusted to change the optical characteristics of the output from the optical element 64. The optical element 64 may, for example, be a lens element such as a Fresnel lens or holographic lens, which changes the optical characteristics of the input light beam. In one embodiment, the optical element 64 may be separately fabricated and may be secured to a movable element of a stepper motor 62. The securement may be accomplished using a variety of techniques including adhesive securement, friction welding, surface mount techniques, or soldering, as examples.

Instead of using stepper motors 62 other nanofabricated devices may be used as a microactuator. Another example of a microactuator uses microfabricated interdigitated combs that are electrostatically displaced relative to one another.

Figure 5:
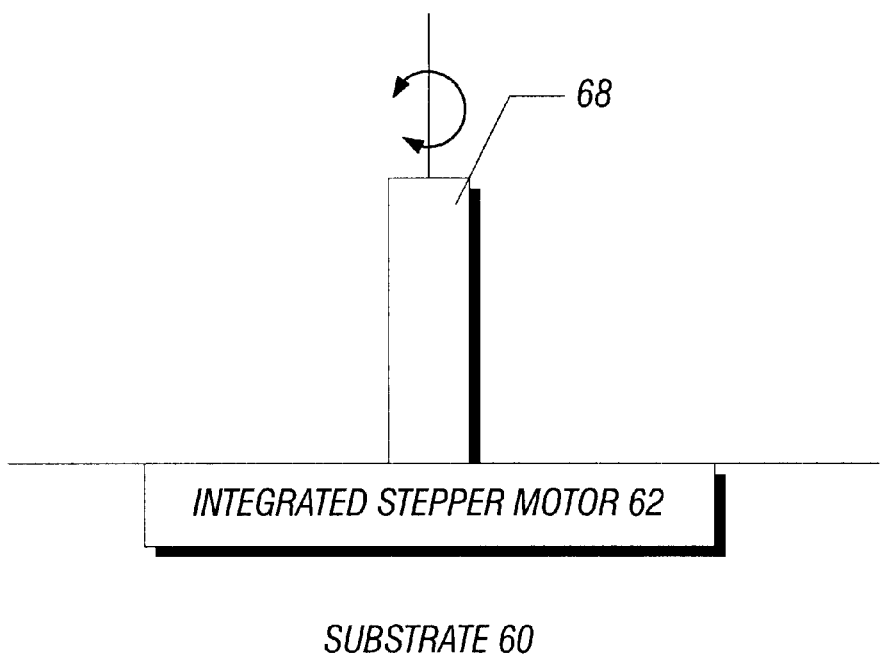
FIG. 5 is a schematic depiction of an adjustable mounting for a scanner mirror.
Figure 6:
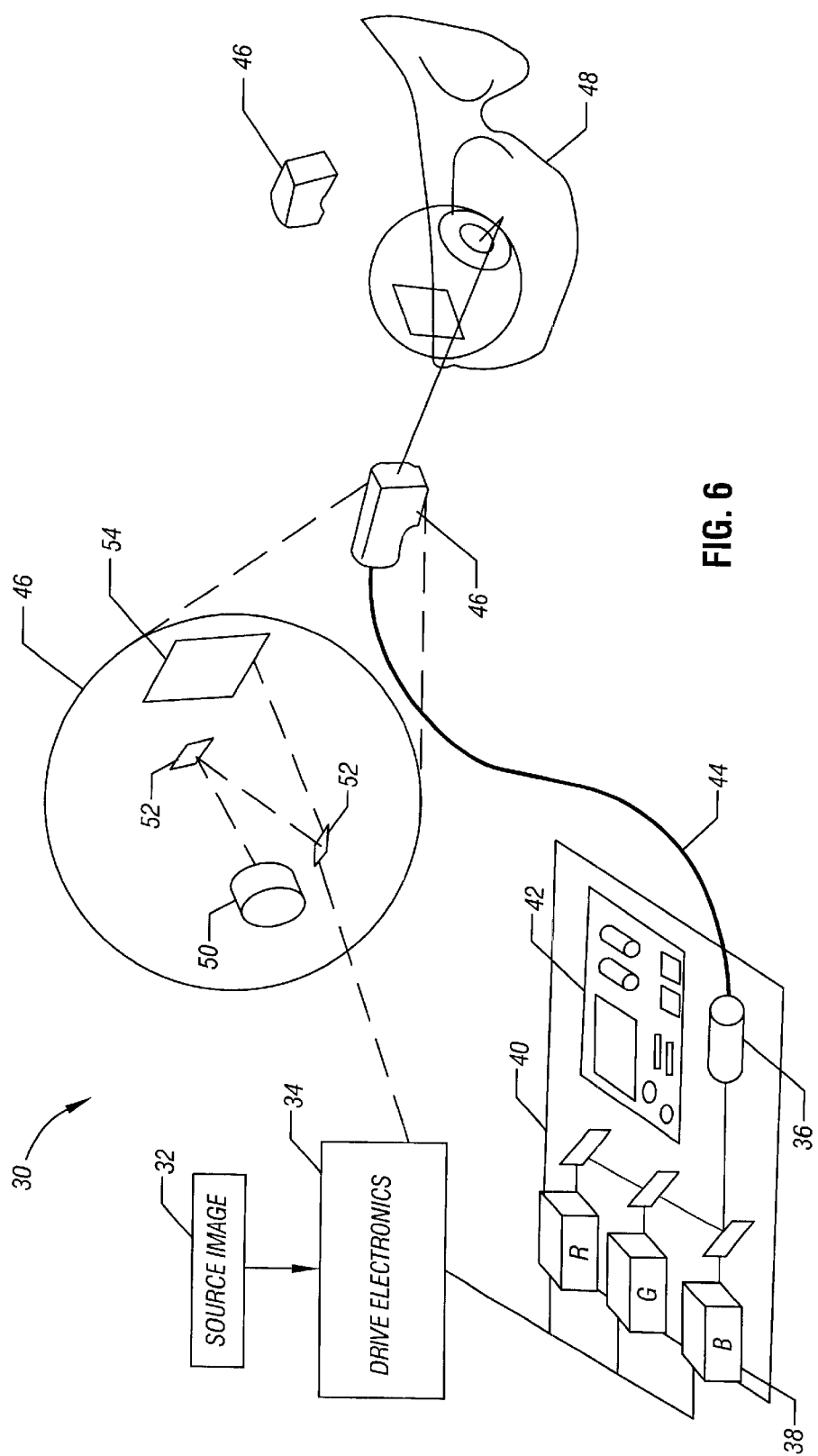
FIG. 6 is a depiction of a prior art virtual retinal display.

Referring to FIG. 5, an integrated stepper motor 64 may be utilized to apply a rotary motion, indicated by the arrows, to an optical mirror 68 that is part of the scanner 24. The integrated stepper motor 64 may include one or more stepper motors that precisely control the angular orientation of the mirror 68 to provide the desired scanning operation. Again the stepper motor 64 may be formed in the substrate 60 using conventional nanotechnology microfabrication techniques. By varying the angle of the mirror 68, a light source may be scanned across the user's retina.

By integrating the components on or in a single integrated circuit 14, a relatively compact, lightweight device may be created. Moreover, because of the reduction of interconnections, power consumption may be reduced. Thus, a highly desirable, economically fabricatable device may be possible.

In one embodiment of the present invention, the integrated circuit 14 is mounted within the display 10 in a relatively horizontal configuration, directed so that the output optics 30 generate an image that enters the human eye through the pupil and exposes the retina. In some cases, a pair of outputs may be provided from the same integrated circuit 14, for example, spaced on opposite sides of the same integrated circuit 14, or the outputs may be from spaced apart on the same side of a single integrated circuit 14.

In some embodiments, the processing of signals may be done off the circuit 14, for example to reduce power consumption. The externally processed signals may be received by the circuit 14 and applied to on-chip components such as the optics 28 and 30 and scanner 24.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A retinal display comprising:

a light source;

a scanner to scan light from said source directly into the eye of a user;

an optical device to condition said light; and an integrated circuit including drive electronics, a microactuator in the form of an integrated stepper motor, and integrated connections to said scanner and said optical device.

2. The display of claim 1 wherein said integrated circuit includes a microactuator to operate said scanner.

3. The display of claim 2 wherein said integrated circuit includes a microactuator to operate an optical device to condition said light.

4. The display of claim 3 wherein said optical device includes a lens and said stepper motor positions said lens.

5. The display of claim 1 wherein said scanner includes a mirror to deflect light from said light source and said stepper motor drives said mirror.

6. A method comprising:

mounting a light source on an integrated circuit;

mounting a scanner on said integrated circuit to scan light from said light source directly into the eye of a user;

mounting an optical device to condition said light on said integrated circuit;

positioning a mirror in said scanner using said microactuator; and developing signals in said integrated circuit to control said scanner and said optical device.

7. The method of claim 6 including operating an microactuator formed in said integrated circuit to control said scanner and said optical device.

8. The method of claim 6 including positioning a mirror in said scanner using said microactuator.

9. A retinal display comprising:

an integrated circuit including drive electronics;

a light source mounted on said integrated circuit and electrically coupled to said integrated circuit;

a scanner to scan light from said source directly into the eye of the user, said scanner including a mirror and a microactuator electrically coupled to said integrated circuit; and an optical device to condition said light, said optical device including a lens and a microactuator, said microactuator electrically coupled to said integrated circuit to control the position of said lens.

10. The display of claim 9 wherein said light source produces red, green and blue light.

11. The display of claim 9 wherein said light source is surface mounted on said integrated circuit.

12. The display of claim 9 wherein said microactuator is a linear stepper motor.

13. The display of claim 9 wherein said integrated circuit includes drive electronics with signal processing.

14. The display of claim 9 wherein said integrated circuit includes a radio frequency receiver that receives a signal from a remote device, said signal including commands for said scanner and optical device.

* * * * *